Dec. 11, 1962 F. G. PAXTON 3,067,534
METHOD OF MARKING POULTRY
Filed March 7, 1961
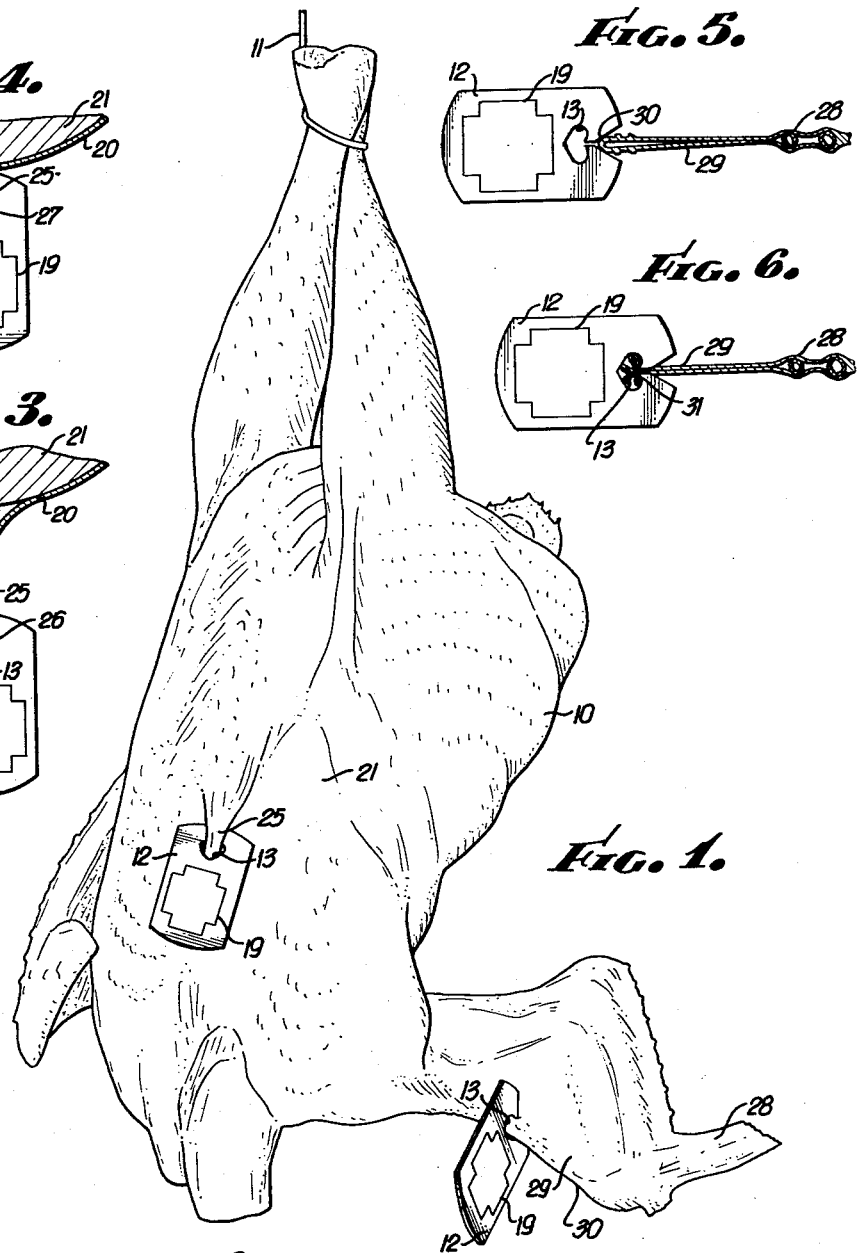
Floyd G. Paxton
INVENTOR.
BY
ATTORNEY.

United States Patent Office 3,067,534
Patented Dec. 11, 1962

3,067,534
METHOD OF MARKING POULTRY
Floyd G. Paxton, P.O. Box 2098, Yakima, Wash.
Filed Mar. 7, 1961, Ser. No. 93,898
1 Claim. (Cl. 40—23)

This invention relates to fresh meat inspection services of various governmental agencies and particularly to a method for properly marking dressed poultry which the government inspector has certified as wholesome.

Heretofore various expedients have been used for this purpose. For one reason or another all of these have proved unsatisfactory on dressed poultry. The oldtime government stamp in indelible ink is difficult to apply in the presence of any moisture on the skin and is furthermore objectionable, as a patch of the skin must be removed to eradicate the stamp.

An alternate method in common use is to print the certification data on small cardboard tags and apply a string loop on which one of these tags is strung, to a wing of the fowl. This is satisfactory from the standpoint of not defacing the product but requires considerable time to accomplish even when, to speed up the operation, the worker merely places the string loop loosely one time around the wing. In the latter case, of course, this loop is readily displaced from the wing, thereby disqualifying the fowl for sale as certified.

It is an object of the present invention to provide a method of marking certified dressed poultry which may be easily and cheaply performed, wherein the mark is relatively proof against inadvertent removal from the product, yet will not deface the product and can be readily separated therefrom by the ultimate consumer of the product.

The manner of accomplishing the foregoing object as well as further objects and advantages will be made manifest in the following description taken in connection with the accompanying drawing in which FIG. 1 is a perspective view of a dressed chicken illustrating two variations in the preferred mode of marking a dressed fowl by the method of the present invention.

FIG. 2 is a double size view of a tag employed in the method of the present invention.

FIG. 3 is a full scale diagrammatic view illustrating initial and intermediate steps in one of the optional modes of performing the method of the invention.

FIG. 4 is a full scale diagrammatic view similar to FIG. 3 and illustrating the completion of the method the start of which is illustrated in FIG. 3.

FIG. 5 is a full scale diagrammatic view of initial and intermediate steps in another alternate mode of performing the method of the invention.

FIG. 6 is a view similar to FIG. 5 and illustrates the completion of the method shown being started in FIG. 5.

Referring specifically to the drawings, a dressed chicken 10 is shown in FIG. 1 suspended on a string 11 as when such chickens are presented for inspection by a government inspector. The prime object of the invention is to enable the inspector to quickly and easily mark the chicken 10 in a manner so that in the channels of trade through which it passes it will be adequately identified as having been government inspected and approved as wholesome.

The method of the present invention facilitates such marking by providing a method of applying to the chicken 10 of a sheet plastic tag 12 which is preferably about ⅞ of an inch wide, 1⅜ inches long and has a thickness of about .011 inch. This tag may be formed by die-cutting the same from a continuous strip of sheet plastic ⅞ of an inch wide and this die-cutting operation provides each tag 12 with a mouth 13 which communicates with a front edge 14 of the tag through a relatively narrow passage 15 so as to provide jaws 16 on opposite sides of said passage. The outer portion of the passage 15 is preferably enlarged to provide diverging edges 17 on the jaws 16. Teeth 18 are provided on jaws 16 on opposite sides of passage 15, these teeth pointing inwardly.

The first step in preparing to practice the present method is to print on the tags 12 the proper certification data which is customarily outlined with a Geneva cross 19 as shown in the drawings. There are two general modes of performing the method of the invention which will be distinguished hereinafter by designating these as mode A and mode B. To mark the chicken 10 in accordance with mode A, the inspector seizes the loose skin 20 covering the breast 21 of the chicken 10 with one hand so as to form a fold 25 of double thickness of said skin and stretches this fold taut by pulling on the same parallel with the breast 21 and in a downward direction with the chicken 10 suspended as shown in FIG. 1. Holding a tag 12 in the other hand, the inspector applies the end edge 14 of the tag to the skin fold 25 as shown in FIG. 3, close to the hand with which the skin fold is being gripped, and with the bight 26 of the fold disposed at the narrowest portion of the passage 15. At this time the plane of the tag 12 is preferably perpendicular to the plane of the skin fold 25.

Immediately upon applying the tag 12 in this manner to the fold 25 the inspector coincidentally presses the tag against the fold and moves it lengthwise of the fold away from the hand which is gripping the fold. The friction thus produced between the skin of the fold and the jaws 16 deflects the inner portions of these jaws out of the plane of the balance of the tag 12 and away from each other so as to admit the fold 25 into the tag mouth 13. The skin fold 25 thus becomes bunched within the mouth 13 as shown at 27 in FIG. 4. When the inspector relaxes his hold both on the skin fold 25 and the tag 12 after applying the latter as above described, the natural tension of the skin 19 causes the teeth 18 of the jaws 16 of the tag 12 to prick the skin 19 where these teeth contact the same so as to prevent direct removal of the tag 12 from the chicken 10 by pulling this tag away from the chicken.

The only way the tag 12 may be removed from the chicken 10 when it has been applied as above described, without tearing the skin confined within the mouth 13 of the tag, is to reverse the operation of applying the tag by restretching the skin fold 25 and shifting the tag 12 lengthwise of the fold 25 with the tag 12 canted so that the teeth 18 do not dig into the skin fold and so the edges 17 of the jaws 16 are presented to the skin fold and thus cam the tag 12 out of engaging relation with the skin fold.

In order to perform mode B of the method of the present invention, the inspector seizes a wing 28 of the chicken 10 and pulls this from the body of the chicken so as to stretch the double skin web 29 which fills in the angle between the bones of the wing 28, so as to form the web 29 into a skin fold similar to the skin fold 25 to which the tag 12 is applied in mode A of the method of the invention. With the web 29 thus stretched by pulling the same away from the body of the chicken 10, the inspector applies a tag 12 to the bight 30 of the web 29 at a point near the outer end of this bight and with the tag 12 in a plane perpendicular to the plane of the web 29, and then simultaneously forces the tag inwardly and runs the tag lengthwise of the edge 30 thereby causing the inner portions of the jaws 16 of the tag to be deflected from the plane of the balance of the tag thereby increasing the distance the jaws are separated to permit the skin web 29 to pass through passage 15 and into mouth 13 to bunch up therein as indicated at 31 in FIG. 6.

Only one tag 12 is required for marking a chicken 10, the application of two such tags being shown in FIG. 1, merely to illustrate the two preferred optional modes of performing the method of the invention.

The application of the marking tag 12 by either of the two modes above described is facilitated by the inspector who applies the tag extending two fingers of the hand holding the tag behind the jaws 16 and on opposite sides of the skin fold, whereby the diverging jaw edges 17 are in advance of the teeth 18 during the application of the tag. This prevents the teeth 18 sticking into the skin during application of the tag and retarding the lengthwise movement of the tag in applying the same.

The claim is:

A method of marking a fowl with a tag comprising a small flat sheet of relatively stiff but springy plastic material having a mouth of substantial size formed inwardly from an edge of said tag and a narrow passage through which said mouth communicates with said edge to provide a pair of opposed jaws each having a pointed tooth lying along said passage, with the point of each tooth projecting a short distance into said mouth, stretching taut a fold of loose skin on said fowl to pull the same away from the body thereof, applying said edge of said tag to said skin fold with said tag substantially perpendicular to the plane of said skin fold and with said passage in said plane and positioned to admit said skin fold thereinto, moving said tag lengthwise of and across said skin fold toward said body to frictionally engage said jaws with said skin fold, thereby flexing said jaws transversely out of the plane of said tag to increase the width of said passage and cause a substantial portion of said skin fold to be forced through said passage to a position inwardly of said teeth and to be bunched together in said mouth, and relaxing said tension on said skin fold and permitting said jaws to spring back into the plane of said tag with said teeth sticking into said skin and trapping said bunched skin fold in said mouth.

References Cited in the file of this patent

UNITED STATES PATENTS

| | | |
|---|---|---|
| 1,426,853 | Geist | Aug. 22, 1922 |
| 1,429,465 | Tolg | Sept. 19, 1922 |
| 1,984,880 | Ker, et al. | Dec. 18, 1934 |
| 2,847,774 | Brooks | Aug. 19, 1958 |